United States Patent [19]

Tanner et al.

[11] Patent Number: 5,226,851
[45] Date of Patent: Jul. 13, 1993

[54] LOW BACKLASH COMPENSATING COUPLER

[75] Inventors: Douglas J. Tanner; Jeffrey J. Hallermann, both of St. Cloud, Minn.

[73] Assignee: General Signal Corporation, Stamford, Conn.

[21] Appl. No.: 721,897

[22] Filed: Jun. 27, 1991

[51] Int. Cl.⁵ ............................ F16D 3/72; F16D 3/04
[52] U.S. Cl. ....................................... 464/101; 464/84; 464/102; 464/147
[58] Field of Search ...................... 464/51, 81, 82, 84, 464/101, 102, 106, 147, 150, 152, 98, 99; 403/291, 302, 309

[56] References Cited

U.S. PATENT DOCUMENTS

| | | | |
|---|---|---|---|
| 1,306,541 | 6/1919 | Herreshoff | 464/101 |
| 2,591,769 | 4/1952 | Beechler | 464/101 |
| 2,724,251 | 11/1955 | Weaver | 464/101 |
| 3,313,126 | 4/1967 | Somervell | 464/101 |
| 3,512,419 | 5/1970 | Stiles | 464/84 X |
| 4,518,369 | 5/1985 | Shinsen | 464/101 |
| 4,634,396 | 1/1987 | Tangorra | 464/51 X |
| 4,834,690 | 5/1989 | Ueno | 464/101 X |

*Primary Examiner*—Daniel P. Stodola
*Assistant Examiner*—William G. Battista, Jr.
*Attorney, Agent, or Firm*—Barnes & Thornburg

[57] ABSTRACT

A compensating coupler uses spring coupling legs and tabs to connect a rotary (reciprocating) input drive to a rotary (reciprocating) output drive. The coupler exhibits very low backlash and compensates for misalignment between the input and output drives.

14 Claims, 2 Drawing Sheets

LOW BACKLASH COMPENSATING COUPLER

BACKGROUND AND SUMMARY OF THE INVENTION

The invention is related to a compensating coupler using a spring drive to connect a rotary (reciprocating) input drive to a rotary (reciprocating) output drive. The coupler exhibits very low backlash and compensates for misalignment between the input and output drives.

It is known to provide couplings between a rotary or reciprocating input shaft to an output shaft wherein the output shaft makes a corresponding angular movement to that movement of the input shaft.

Such drives have application in valving systems wherein an actuator turns a valve to open and close it while at the same time the actuator or valve drives an indicator or positioner that identifies the position of the valve. These drives are called "selsyn" drives to indicate that angular input is translated to an equal angular output at a remote location from the input.

Problems occur with such drives in that complicated mechanisms have to be provided to align square, octagonal or hexagonal input and output drive shafts. Where round shafts are used, different types of aligning mechanisms are required for the couplings. Usually a nut is screwed on the round shaft or a flat is provided on the rounded surface for attachment to a coupler.

With polygonal drive shafts positive position indication is more easily obtained since an indexed drive from a flat surface of a rotating shaft is easier than from a round surface.

Ideally, the coupling should allow for some axial (X and Y directions) and some rotational misalignment between input and output without sacrificing the quality of the traced movement. At the same time, the coupling should be simple in construction and inexpensively manufactured and assembled. Normally, the fewer the parts in the coupling, the more economic is its manufacture and installation.

It is an object of this invention to provide a coupling that is simple in manufacture, easy to assemble, with a high quality traced movement (low backlash) and which compensates for some misalignment between input and output.

These and other objects are achieved by providing a one-piece coupling having a plurality of legs extending up from a hub for receiving a first drive adjacent the ends of the legs and tabs extending up from the hub for receiving a second drive. A preferred embodiment of such a coupling is obtainable from a spring stock material cut with four legs at 90° intervals about a center hub. The hub includes a square hole with four tabs adjacent thereto. The tabs are cut at a 45° angle with respect to the legs such that the axis of each leg is in alignment with side edges of adjoining tabs. The tabs are bent at an approximate 75° angle with respect to the hub and are straight along their length. The length of the tabs are approximately 1/6 the length of the legs. The legs include a first portion co-planar with and extending to the hub, a middle portion extending from the first portion and curved toward the hub and terminating at a 75° angle from the hub to parallel the tabs and an end portion (approximately 1/6 the length of the leg) bent outwardly approximately 60° from the middle portion of the leg that is parallel to the tab.

A first square drive shaft is inserted into the square hole in the hub from the side away from the tab and leg ends and is held by the inwardly sloped tabs.

A second square drive shaft is inserted from an area adjacent the open end of the legs with flat sides thereof aligned approximately 90° with respect to sides of the first square drive shaft, to rest with its flat sides between the spring legs. If either drive shaft is not square, at least one flat axis surface is required. This can be a nut threaded on a circular shaft or a milled flat.

While the preferred embodiment of the coupling has been shown with four legs and tabs, different numbers could be used. E.g., with hexagonal drives, one could use a six-legged and six-tabbed coupling; for octagonal drives, one would use eight-legged and eight-tabbed coupling, etc. Also the input and the output do not need to have the same number of sides. The number of legs could differ from the number of tabs or alternatively only some of the sides need be grasped between the legs and/or tabs.

Other objects, advantages and moved features of the present invention will become apparent from the following detailed description of the inventions when considered in conjunction with the accompanying drawings.

DETAILED DESCRIPTION OF THE DRAWINGS

Figure 1:
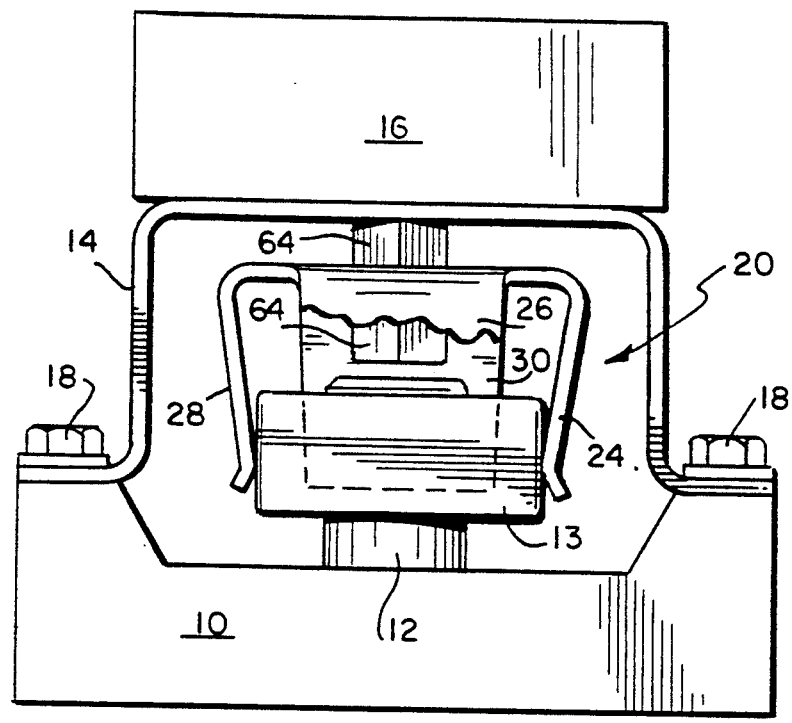
FIG. 1 shows the coupling of the invention connecting a valve drive to a feedback positioner.
Figure 2:
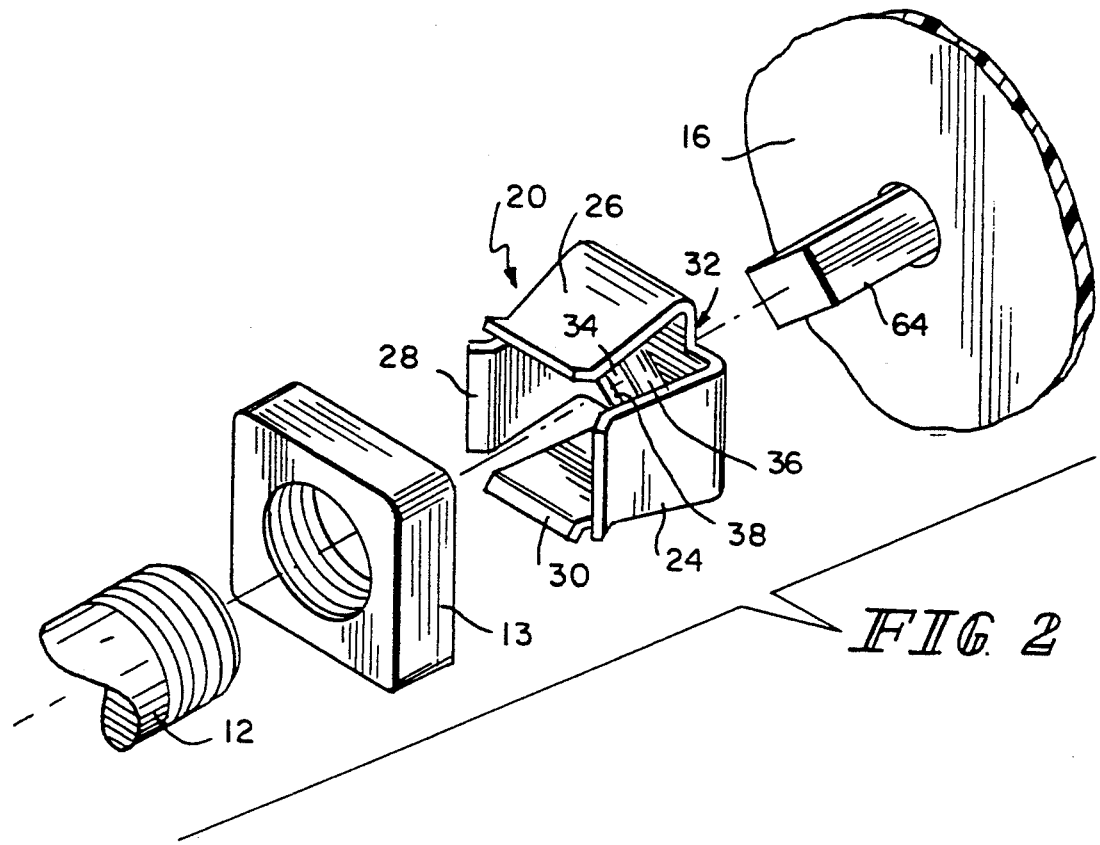
FIG. 2 shows an exploded view of the assembly of FIG. 1.

FIG. 1 shows a valve actuator drive mechanism 10 having a round drive shaft 12 and nut 13 providing an input to the coupling 20 of the invention. The valve (not shown) is connected to the actuator drive mechanism 10. Mounted to the valve actuator drive mechanism is a generally U-shaped brace 14 secured to the valve actuator 10 by four bolts 18. A positioner 16 provides feedback as to the position of the actuator shaft 12.

Figure 3:
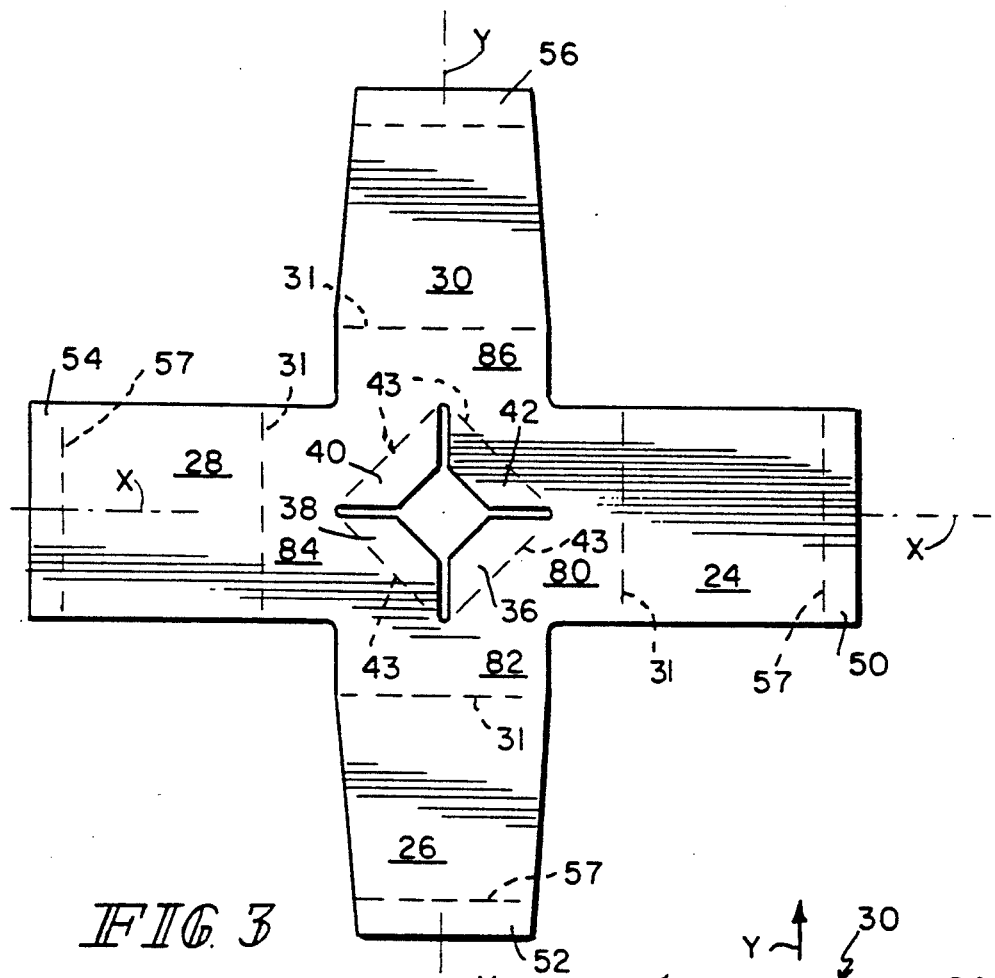
FIG. 3 shows a plan view of the coupling blank prior to bending of the legs and tabs.

The coupling 20 is formed from a flat spring metal plate 22 (FIG. 3) has four outwardly extending legs 24, 26, 28, 30 around a hub portion 32, which has a generally square hole 34 in its center and four tabs 36, 38, 40, 42 facing inwardly to the center hole 34. The legs, center hole and the tabs may be formed in a simple stamping operation. The middle portion of legs 24, 26, 28, 30 are bent on a curve to an angle of approximately 75° (with respect to the hub 32) at their junction to the hub 32 at crease lines 31 to the position shown in FIGS. 4 and 5. The crease in 31 is displaced from the hub such that a first or inner portion 80, 82, 84 86 of each of the legs is coplanar with the hub 32. The end or tip portions 50, 52, 54, 56 of the legs are canted outwardly at approximately a 60° angle from their middle portion along crease lines 57. In manufacture, the angles in the legs tip portions 50, 52, 54, 57 would normally be made from the flat stock first in a single pressing and prior to the curved bending of the leg at the crease 31. The legs 24, 26, 28, 30 are equally spaced around the hub 34.

The tabs 36, 38, 40, 42 are also folded upward and inwardly and at an approximate angle of 75° to the hub 32 along crease lines 43. There is no further bend in the tabs. The tabs are also equally spaced around the hub and are offset by 45° from the legs. The tabs terminate in flat ends that are parallel to opposed flats on ends of the drive to be connected thereto as explained later.

By having the tabs 36, 38, 40, 42 at a 45° angle from the legs 24, 26, 28, 30 and by having the inner portions 80, 82, 84, 86 of the legs flat to form part of the hub 32, a stronger hub is obtained than if the tabs 36, 38, 40, 42 were parallel to the legs 24, 26, 28, and 30 and if the crease lines 31 were located at the juncture point of two adjacent legs (i.e., more to the center of the hub 32). In addition, by having the inner portion 80, 82, 84, 86 of the leg coplanar with the hub, the legs apply a greater clamping force to the tip portion of the leg during minor misalignments, as will be explained later.

Figure 4:
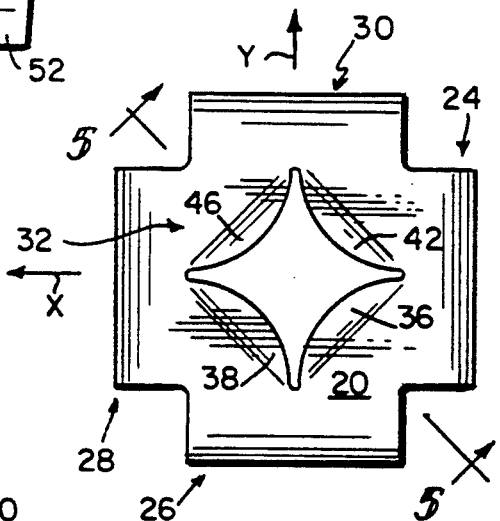
FIG. 4 shows a plan view of the coupling blank after bending of the legs and tabs.
Figure 5:
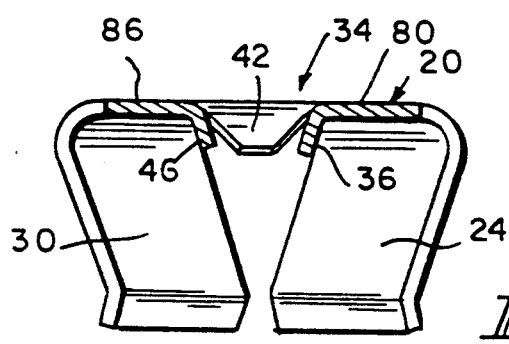
FIG. 5 shows a cross-sectional side view of the coupling after the legs and tabs are bent, from the FIG. 3 flat configuration, and then along the line 5—5 of FIG. 4.

The coupling 20 is mounted onto the square shaft 64 of the valve feedback positioner mechanism 16 and in an inverted position from that shown in FIG. 4 and 5 as can be seen in FIG. 1. Thus the tabs 36, 38, 40, 42 grasp the square shaft 64 as it is projected through the hole 34 in the hub 32 to secure the coupling 20 to the valve positioner drive 16.

A bolt nut 13 is screwed on shaft 12 of the valve actuator 10 to provide a flat surface to be engaged by the legs 24, 26, 28, 30. The square shaft 64 of the positioner 16 is adjusted angularly to align with the nut 13 in any well known manner. The bolt nut 13 extends between the tip portions 52, 54, 56, 58 of the legs 24, 26, 28, 30 to drive the coupling thereby. Thus as the valve actuator 10 moves the valve (not shown), the shaft 12 drives the coupling 20 through contact of the bolt nut 13 and the legs 24, 26, 28, 30 and this causes the tabs 36, 38, 40, 42 that grasp the shaft 64 to rotate the square shaft 64 of the feedback positioner 16.

The above spring coupling 20 can compensate for axis misalignments of the centerline of the shafts 64 and 12. Since the tabs are relatively short, they cannot flex to much of an extent and thus generally secure the coupling 20 about shaft 64. However the legs 24, 26, 28, 30 being longer can flex in the X and Y directions (FIG. 4). If the center axis of shaft 12 is offset from the center axis of square drive 64 (in the directions of the arrow Y FIG. 4), legs 30 and 26 will bend outwardly and inwardly respectively (or upwardly in FIG. 4) to still provide a positive drive due to their spring nature.

The legs 24, 26, 28, 30 in a rest positions have their crease areas 57 immediately adjacent if not touching one another. That is, their natural spring tendency (if only one leg were present) would be to force the crease area 57 to overlie the hole 34. The portion of the legs adjacent the crease increase the contact surface area and the resiliency. Thus the legs 24, 26, 28, 30 are spread apart to grasp the nut 13 and can flex inwardly and outwardly to a limited extent to accommodate misalignment in the Y (FIG. 4) direction. The same misalignment can occur in the X direction (FIG. 4) and will be compensated in the same manner. While the above misalignment has been referenced in the direction of the arrows X and Y, it of course can take place in a direction opposite to the arrow heads as well as a combination of X and Y.

As the tips 50, 52, 54, 56 are moved inward or outward, the juncture of the legs to the inner portions will be flexed downward or upward. The natural preset of the inner portions 80, 82, 84, 86 will resist flexure.

If there is a slight rotational misalignment between shaft 64 and bolt-nut 13 (i.e., the flats of their sides are not at 45° relative to each other), the legs again will flex but the spring will still prove a fixed drive without backlash. Also, if the axis of shaft 64 and the axis of bolt-nut 13 are not parallel, the coupling 20 can also accommodate this misalignment.

While a nut 13 has been attached to shaft 12 to provide flat drive surfaces, such could, of course, be obtained by one or more flat surfaces being created on the shaft 12 itself.

While it was pointed out previously that the number of legs and tabs would be the same, such is not necessary. A six- or eight-sided nut 13 could be used with a corresponding number of legs spaced angularly equidistantly about the coupling 20. Alternatively, only opposing pairs (or less than all of the flat surfaces of the shafts 12, 64 or nuts 13) on some of the flat surfaces need be in driving contact with tabs and legs.

While the coupling 20 has been shown as applied to drive a positioner 16 from a valve drive 10, the coupling has utility in any low torque drive situations where low backlash with inexpensive costs are desired. While the input is shown connected to the tabs and the output to the legs, these can, of course, be reversed so the input drives the legs and the output is driven by the tabs. The tabs are designed to accommodate the smaller diameter coupling and the legs, to accommodate larger diameter coupling.

Although the present invention has been described and illustrated in detail, it is to be clearly understood that the same is by way of illustration and example only, and is not to be taken by way of limitation. The spirit and scope of the present inventions are to be limited only by the terms of the appended claims.

We claim:

1. A motion transmitting mechanism for transmitting rotary motion from an input member to an output member about a rotational axis comprising:

coupling means connectable to an input member to be driven thereby and connectable to an output member to rotate the output member in response to the rotation of the input member when both input and output members are connected to the coupling means;

said coupling means being a one piece spring stock material with a hub portion and having plural leg means and plural tab means bent from the hub portion of the coupling means, said leg means connectable to one of the output and input members to transmit rotary motion therebetween and said tab means connectable to the other of the output and input members to transmit rotary motion therebetween, wherein there are at least four tab means and at least four leg means;

wherein the tab means and the leg means are equally angularly spaced about the hub portion;

wherein at least two of the four tab means and two of the leg means face each other and each have a gripping surface that is substantially equidistantly opposed to the other respective leg or tab means gripping surface with respect to the rotational axis, and wherein the plural leg means are connectable to the said output or input member to transmit motion by virtue of having the gripping surfaces springly engage their respective input or output members therebetween.

2. The motion transmitting mechanism of claim 1 wherein the tab means are extended outwardly from an interior area of said hub portion and the leg means extended in the same outwardly direction as the tab means, but from an exterior area of said hub portion and thus the leg means provide at least a partial covering over the tab means.

3. The motion transmitting mechanism of claim 2 wherein the tab means and the leg means are bent from the hub portion at a similarly valued angle.

4. The motion transmitting mechanism of claim 2 wherein the leg means have a flat surface which has three portions along a length thereof;
   wherein a first portion is substantially planar with the hub portion;
   wherein a middle portion is canted from the first portion; and
   wherein an end portion is canted from the middle portion.

5. The motion transmitting mechanism of claim 4 wherein the middle portion cants inwardly to a center axis of the hub portion and wherein the tip portion cants outward away from the center axis of the hub portion.

6. The motion transmitting mechanism claim 5 wherein the angle of the cant of the middle portion of the leg means and the angle of the bend of the tab means with respect to the hub portion is the same.

7. The motion transmitting mechanism of claim 2 wherein the hub portion has a polygonal hole for receiving one of the input or output members.

8. The motion transmitting mechanism of claim 2 wherein the tab means are shorter in length than the bent leg means and wherein that ends of the leg means extend in the same direction as the tab means and beyond ends of the tab means so as to be in general alignment therewith.

9. The motion transmitting mechanism of claim 1 wherein the tab means and the leg means are bent from the hub portion at a similarly valued angle.

10. The motion transmitting mechanism of claim 1 wherein the leg means have a flat surface which has three portions along a length thereof;
    wherein a first portion is substantially planar with the hub portion;
    wherein a middle portion is canted from the first portion; and
    wherein an end portion is canted from the middle portion.

11. The motion transmitting mechanism of claim 10 wherein the middle portion cants inwardly to a center axis of the hub portion and wherein the end portion cants outward away from the center axis of the hub portion.

12. The motion transmitting mechanism of claim 11 wherein the angle of the cant of the middle portion of the leg means and the angle of the bend of the tab means with respect to the hub portion is the same.

13. The motion transmitting mechanism of claim 1 wherein the hub portion has a polygonal hold for receiving one of the input or output members.

14. The motion transmitting mechanism of claim 1 wherein the tab means are shorter in length than the bent leg means and wherein that ends of the leg means extend in the same direction as the tab means and beyond ends of the tab means so as to be in general alignment therewith.

* * * * *